United States Patent [19]

Mackey

[11] Patent Number: 5,670,553
[45] Date of Patent: Sep. 23, 1997

[54] INTERNAL MOLD RELEASE COMPOSITIONS

[75] Inventor: Paul William Mackey, Sylvan Lake, Mich.

[73] Assignee: Imperial Chemical Industries PLC, London, England

[21] Appl. No.: 705,869

[22] Filed: Aug. 28, 1996

Related U.S. Application Data

[62] Division of Ser. No. 520,279, Aug. 25, 1995, Pat. No. 5,576,409.

[51] Int. Cl.$^6$ .................................................. C08G 18/00
[52] U.S. Cl. ........................................ 521/128; 521/130
[58] Field of Search ................................ 521/128, 130

[56] References Cited

U.S. PATENT DOCUMENTS

| | | | |
|---|---|---|---|
| 3,726,952 | 4/1973 | Boden et al. | 264/48 |
| 3,875,069 | 4/1975 | Worschech et al. | 252/56 |
| 3,993,606 | 11/1976 | Von Bonin et al. | 260/2.5 |
| 4,024,090 | 5/1977 | Von Bonin et al. | 260/2.5 |
| 4,058,492 | 11/1977 | Von Bonin et al. | 260/2.5 |
| 4,098,731 | 7/1978 | Von Bonin et al. | 521/51 |
| 4,130,698 | 12/1978 | Sparrow et al. | 521/130 |
| 4,546,154 | 10/1985 | Robertson | 525/474 |
| 5,128,087 | 7/1992 | Slocum et al. | 264/300 |
| 5,389,696 | 2/1995 | Dempsey et al. | 521/128 |

*Primary Examiner*—Morton Foelak

[57] ABSTRACT

An internal mold release system is provided which comprises (a) a carboxylic acid and (b) a compound selected from the group consisting of a fatty polyester, a fatty acid ester and a fatty amide.

7 Claims, No Drawings

INTERNAL MOLD RELEASE COMPOSITIONS

CROSS REFERENCE TO RELATED APPLICATIONS

The present application is a division of U.S. application Ser. No. 08/520,279 entitled "Internal Mold Release Compositions" filed Aug. 25, 1995 now U.S. Pat. No. 5,576,409.

FIELD OF THE INVENTION

The present invention is related to internal mold release systems. More specifically, the present invention is directed to internal mold release systems which are particularly useful in structural reaction injection molding applications.

BACKGROUND OF THE INVENTION

The present invention relates to internal mold release systems which may be used in the preparation of reaction injected polyurethanes and polyurea foam articles. These internal mold release systems are particularly useful in manufacturing shaped resin components by the structural reaction injection molding (SRIM) process, wherein a liquid stream of polyisocyanate is impingement mixed with at least one other stream containing active hydrogen-containing liquids and optionally, catalysts, fillers, mold release systems, etc., and transferred to a heated metal mold. A glass mat or a mat of other structural fibers is placed into the mold prior to the impingement mixing of the components so that the final product is a reinforced composite. SRIM processes are used commercially to manufacture various articles where high strength and low weight are of importance. For example, SRIM processes are used to manufacture interior trim substrates for automobiles, such as door panels, package trays, speaker enclosures and seat pans.

Developments in the chemistry of the polymer systems used in SRIM processes have resulted in urethane and urethane-urea polymers which are sufficiently cured to be demolded within about 50–90 seconds after injection. SRIM equipment has also improved so that the mechanics of opening and closing the mold also require only about 40–70 seconds. Urethane polymers, being excellent adhesives, bond tenaciously to metal making it necessary to utilize a release agent so that parts can be quickly and easily removed from the mold without damage or distortion.

External mold release agents are used by applying the release agent directly to the surfaces of the mold. The mold must be completely covered with the release agent, generally by spraying a solution or an emulsion of a soap or wax onto the surface of the mold. This procedure requires a minimum of 30–60 seconds and must be repeated at least after every one to five parts, thus increasing the part to part cycle time by as much as 50%. Additionally, this constant spraying often causes excessive mold release agent to build up on areas surrounding the mold surface or on the mold surface itself. In this instance, the mold must be periodically wiped off and/or cleaned by solvent or detergent wash which is both time consuming and costly for the part manufacturer.

Thus, it is clear that mold release agents or systems which may be contained in the reaction systems themselves, i.e., internal mold release agents or systems, would be advantageous in eliminating such difficulties, increasing productivity and reducing part cost. Various internal mold release agents have been proposed in an attempt to solve these problems. For example, U.S. Pat. No. 4,546,154 discloses the use of 0.5–1.5 percent by weight of polysiloxane mold release agents in reaction injection molding systems for this purpose. However, such materials have been found to provide an insufficient number of releases to make their use commercially acceptable.

Certain acids, such as fatty acids and their esters, are known to act as mold release agents. For example, U.S. Pat. No. 4,098,731 discloses the use of salts of saturated or unsaturated aliphatic or cycloaliphatic carboxylic acids containing at least eight carbon atoms and tertiary amines which do not contain amide or ester groups as release agents for polyurethane foam production. U.S. Pat. No. 4,024,090 discloses the use of internal mold release agents which are the esterification reaction products of polysiloxanes and monocarboxylic or polycarboxylic acids. U.S. Pat. Nos. 5,128,807, 4,058,492, 3,993,606 and 3,726,952 all also disclose the use of carboxylic acids or their derivatives as mold release agents. U.S. Pat. No. 4,130,698 discloses the use of esters of a fatty acid, such as glycerol trioleate, olive oil and peanut oil, as a processing aid. However, such systems have proven to be disadvantageous as they provide a relatively minor improvement in release performance, particularly in SRIM systems.

Other materials have been used to provide a release effect in molding operations. For example, U.S. Pat. No. 3,875,069 discloses lubricant compositions useful in shaping thermoplastic material comprising: (A) mixed esters of (a) aliphatic, cycloaliphatic and/or aromatic dicarboxylic acids, (b) aliphatic polyols and (c) aliphatic monocarboxylic acids, with (B) esters of (1) dicarboxylic acids and long chained aliphatic monofunctional alcohols (2) long chained aliphatic monofunctional alcohols and long-chained monocarboxylic acids and (3) full or partial esters of aliphatic polyols and long-chained aliphatic monocarboxylic acids. U.S. Pat. No. 5,389,696 discloses a process for producing a molded foam part using an internal mold release agent which comprises (a) 1–10% of mixed esters comprising the reaction product of i) aliphatic dicarboxylic acids, ii) aliphatic polyols, and iii) monocarboxylic acids. This patent specifically excludes the esters of the U.S. Pat. No. 3,875,069 patent. However, as with other internal release agents, the release materials disclosed in these patents have not demonstrated the ability to provide consistently good results.

SUMMARY OF THE INVENTION

Accordingly, it can be seen that there is a need for internal mold release systems which provide a sufficient number of releases to make them suitable for widespread commercial use. Thus, it is an objective of the present invention to provide internal mold release systems which result in a significantly higher number of releases in comparison to known systems. It is a further objective of the present invention to provide internal mold release systems which are particularly suitable for use in SRIM systems.

The above-mentioned objectives are attained by the present invention which is directed to internal mold release systems which provide an improvement over known systems. The present internal mold release systems have been found to be particularly useful in SRIM applications. The present internal mold release systems comprise a combination of materials which demonstrate a synergistic release activity and provide improved release results in comparison to known systems.

The present invention is directed to internal mold release systems comprising (a) a carboxylic acid and (b) a compound selected from the group consisting of a fatty polyester, a fatty acid ester and a fatty amide. The present invention is further directed to reaction systems comprising an organic polyisocyanate, a compound containing a plurality of isocyanate-reactive groups and the internal mold release system described above, as well as processes utilizing such systems.

DETAILED DESCRIPTION OF THE INVENTION

The present internal mold release systems comprise (a) a carboxylic acid and (b) a compound selected from the group consisting of a fatty polyester, a fatty acid ester and a fatty amide. The term "fatty" as used in the context of the invention means compounds comprising 8 or more carbon atoms and preferably 12 or more carbon atoms. Preferably, these compounds are aliphatic hydrocarbons and most preferably, linear aliphatic hydrocarbons. It has been found by the present inventor that a combination of components (a) and (b) demonstrate synergistic effects. That is, although components (a) and (b) each have mold release properties when used alone, their combination is surprisingly more effective than either component used alone.

Although not wishing to be bound by any single theory, it is the belief of the present inventor that the internal mold release systems of the present invention provide release activity due to the reaction of the carboxylic acid with the isocyanate to form an amide. It is believed that this amide material prevents the normally tenacious sticking of the isocyanate to the mold. Such activity, in synergistic combination with the lubricating effects of the additional fatty material, provide the mold release activity attributable to the present compositions.

In general, any carboxylic acid compounds containing an aliphatic hydrocarbon chain are useful in the present mold release systems. However, it is preferred that the carboxylic acid be liquid soluble or soluble in polyol blends. In general, useful carboxylic acid compounds comprise about 3 to about 100, preferably about 6 to about 54 and most preferably about 18 to about 36 carbon atoms. The carboxylic acid compounds should also have an acid functionality of about 1 to about 4 and preferably about 1 to about 2. It has been found that the release activity of the present systems increases with decreasing functionality of the carboxylic acid compound. Both mono-acids and dimer acids may be used in the present compositions in concentrations of 0 to 95% (of the carboxylic acid component) while the trimer (and higher functionality) content of the acid compounds may range from about 1 to about 60%.

Useful carboxylic acid compounds include polymerized oleic acid, oleic acid, adipic acid, lauric acid, stearic acid, hydroxystearic acid, terephthalic acid, behenic acid, arachidonic acid, linoleic acid, linolenic acid, ricinoleic acid and mixtures thereof. Preferably, the carboxylic acid compound used in the present system is oleic acid or polymerized oleic acid available commercially as HYSTRENE® 3695, 3675 or 5460 from Witco Chemicals. The carboxylic acid component shall generally be used in an amount of about 0.5 to about 5.0%, preferably about 1.5 to about 2.5% and most preferably about 2% by weight of the total reaction system.

The carboxylic acid compounds used in the present internal release systems are present as the amine salts thereof. Useful salts include those of primary, secondary and/or tertiary amines, although it is preferred to use salts of tertiary amines. It is understood that the term "amine" as used herein is meant to include other nitrogen-containing organic bases capable of forming salts with carboxylic acids. These include amidine and guanidine compounds. Useful salts include those of tertiary aliphatic amines or aromatic amines which contain other isocyanate-reactive functional groups, such as hydroxyl groups, primary or secondary amino groups, amide groups, ester groups, urethane groups or urea groups. Moreover, it is contemplated that useful salts may contain more than one tertiary amine group per molecule.

Preferred tertiary aliphatic amines for use in the present invention include N,N-dimethylcyclohexylamine, triethylene diamine, bis-(dimethylamino)-diethyl ether, N-ethylmorpholine, N,N,N',N',N"-pentamethyl diethylenetriamine, N,N-dimethyl aminopropylamine and aliphatic tertiary amine-containing amides of carboxylic acids, such as the amides of N,N-dimethyl aminopropylamine with stearic acid, oleic acid, hydroxystearic acid and dihydroxystearic acid.

Useful tertiary aliphatic amine salts include those prepared by the reaction of oleic or polymerized oleic acid with triethanolamine, triisopropanolamine N-methyl diethanolamine, N,N-dimethyl ethanolamine and mixtures thereof.

Commercially available tertiary aliphatic amines include the POLYCAT® series of amines and the DABCO® amine catalysts both available from Air Products Inc.

The second component of the internal mold release systems of the present invention is a compound selected from (1) a fatty polyester, (2) a fatty acid ester, and (3) a fatty amide or mixtures thereof. In general, this component should be contained in the present internal mold release compositions in an amount of about 0.5 to 5.0, preferably about 1.5 to about 3.5, and most preferably about 2% based upon the weight of the entire system.

Fatty polyesters suitable for use in the present system include polyesters having a number average molecular weight of about 500 to about 12,000, preferably about 800 to about 5000, more preferably about 1000 to about 4000 and most preferably about 2000 to about 3000. Useful fatty polyesters are generally mixed esters comprising the reaction product of three monomers: (1) a monofunctional monomer; (2) a difunctional monomer; and (3) a polyfunctional monomer (i.e., trifunctional or higher). The 'functionality' of these monomers arises from hydroxyl groups, acid groups, or derivatives thereof. Each of monomers (1), (2) and (3) may independently comprise from about 2 to about 54 and preferably about 2 to about 18 carbon atoms.

Preferably, the fatty polyesters used in the present systems are mixed esters comprising the reaction product of (i) aliphatic dicarboxylic acids, (ii) aliphatic polyols and (iii) fatty monocarboxylic acids wherein the monocarboxylic acid comprises about 12 to about 30 carbon atoms, preferably about 16 to about 20 carbon atoms. Useful fatty polyesters include those disclosed in U.S. Pat. No. 3,875,096 which is incorporated herein by reference.

More preferably, the fatty polyesters utilized in the present internal mold release systems comprise the reaction product of (i) adipic acid, (ii) pentaerythritol and (iii) oleic acid. Suitable compounds are available commercially as LOXIOL® G-71S available from Henkel Corporation.

The fatty acid ester compounds useful in the present invention contain at least about 22 carbon atoms and preferably at least about 31 carbon atoms. The maximum number of carbon atoms in the fatty acid ester is limited only where the carbon number causes the material to be unsuitable for blending with or into a polyol. Fatty acid esters suitable for use in the present invention include the esters of stearic acid, oleic acid, linoleic acid, linolenic acid, adipic acid, behenic acid, arachidic acid, montanic acids, isostearic acid, polymerized acids and mixtures thereof.

Examples of suitable fatty acid esters include butyl stearate, tridecyl stearate, glycerol trioleate, isocetyl stearate, ditridecyl adipate, stearyl stearate, glycerol tri-(12-hydroxy) stearate, dioctyl dimerate and ethylene glycol distearate. Preferably, the fatty acid ester is tridecyl stearate. Commercially available fatty acid esters suitable for use in the present invention include the KEMESTER® series of acids available from Witco Chemical, including KEMESTER® 5721, KEMESTER® 5822, KEMESTER® 3681, KEMESTER® 5654 and KEMESTER® 1000.

Useful fatty amide compounds include (1) primary amides comprising at least 18 carbon atoms or (2) secondary or tertiary amides comprising at least 34 carbon atoms. Suitable compounds are oleamide, stearamide, stearyl stearamide, 2-hydroxyethyl (12-hydroxy) stearamide and erucyl erucamide. Commercially available fatty amides include the KEMAMIDE® series of fatty amide compounds also available from Witco Chemical.

The internal mold release systems of the present invention may be prepared by any suitable method known to those skilled in the art as will be evident from the present specification. In general, the present systems may be prepared by simply mixing (a) the carboxylic acid compound and the (b) fatty polyester, fatty acid ester or fatty amide compound into the component of the reaction system containing a plurality of isocyanate-reactive groups or the "B side" of the reaction system. Although it may be formed separately, it is preferred that the acid salt compound be formed by mixing the free acid and the amine into the bulk of the isocyanate-reactive component. The B side of the system is then reacted with the polyisocyanate component or the "A side" of the system in order to form a final polyurethane product. The carboxylic acid compound and the fatty polyester, fatty acid ester or fatty amide component are generally not reacted prior to their addition to the B side of the reaction system as no reaction of these two components is desired.

The present invention is further directed to reaction systems for use in SRIM processes comprising, in part, the present internal mold release systems. The reaction systems also comprise an organic polyisocyanate and a component containing at least one compound comprising a plurality of isocyanate-reactive groups. The isocyanate-reactive component will generally contain the present mold release systems.

The organic polyisocyanates useful in the present invention are those having a number average isocyanate functionality in the range of from about 1.8 to about 4.0. Preferably, the number average isocyanate functionality is from about 2.3 to about 3.0.

The organic polyisocyanates which may be used in the present systems include any of the aliphatic, cycloaliphatic, araliphatic, or aromatic polyisocyanates known to those skilled in the art, especially those that are liquid at room temperature. Examples of suitable polyisocyanates include 1,6-hexamethylene diisocyanate, isophorone diisocyanate, 1,4-cyclohexane diisocyanate, 4,4'dicyclohexylmethane diisocyanate, 1,4-xylylene diisocyanate, 1,4-phenylene diisocyanate, 2,4-toluene diisocyanate, 2,6-toluene diisocyanate, 4,4'diphenylmethane diisocyanate (4,4'-MDI), 2,4'diphenylmethane diisocyanate (2,4'-MDI), polymethylene polyphenylene polyisocyanates (crude or polymeric MDI) and 1,5 naphthylene diisocyanate. Mixtures of these polyisocyanates can also be used. Moreover, polyisocyanate variants, i.e., polyisocyanates which have been modified by the introduction of urethane, allophanate, urea, biuret, carbodiimide, uretonimine, isocyanurate and/or oxazolidone residues can also be used in the present systems.

In general, aromatic polyisocyanates are preferred for use in the present reaction systems. The most preferred aromatic polyisocyanates are 4,4'-MDI, 2,4'-MDI, polymeric MDI, MDI variants and mixtures thereof. Isocyanate-terminated prepolymers may also be employed. Such prepolymers are generally prepared by reacting an excess of polymeric or pure isocyanate with polyols, including aminated polyols, imine- or enamine-modified polyols, polyether polyols, polyester polyols or polyamines. Psuedoprepolymers, which are a mixture of prepolymer and one or more monomeric di- or polyisocyanates, may also be used.

Commercially available polyisocyanates useful in the present reaction systems include the RUBINATE® series of polymeric isocyanates available from ICI Americas Inc.

In most cases, the component of the present reaction systems containing at least one compound containing a plurality of isocyanate-reactive groups is a combination of at least two isocyanate-reactive compounds. Optionally, at least one of these is a softblock component. Softblock components useful in the present reaction system include those conventionally used in the art. The term "softblock" is well known to those in the art. It is the soft segment of a polyurethane, realizing that the polyurethane may encompass isocyanurate rings, urea or other linkages. The isocyanate-reactive compound(s) also generally comprises at least one chain extender and/or cross-linker.

Isocyanate-reactive materials which furnish softblock segments are well known to those skilled in the art. Such compounds generally have a number average molecular weight of at least about 1500 and preferably about 1500 to about 8000, a number-average equivalent weight of from about 400 to about 4000 preferably from about 750 to about 2500, and a number-average functionality of isocyanate-reactive groups of about 2 to about 10 and preferably from about 2 to about 4. Such compounds include e.g., polyether or polyester polyols comprising primary or secondary hydroxyl groups. Preferably, the softblock segments comprise about 0 to about 30 wt % and more preferably about 0 to about 20 wt % of the isocyanate-reactive species of the compound containing a plurality of isocyanate-reactive groups. It is most preferred that the isocyanate-reactive compound(s) comprise (a) about 0 to about 20 wt % of at least one polyol having a molecular weight of 1500 or greater and a functionality of 2 to 4; (b) about 70–98% wt % of at least one polyol having a molecular weight of between about 200 and 500 and a functionality of about 2 to about 6; and (c) about 2 to about 15 wt % of at least one polyol having a functionality of about 2 to about 4 and a number average molecular weight of less than 200. All functionalities and molecular weights described herein with respect to polymeric materials are "number average". All functionalities and molecular weights described with respect to pure compounds are "absolute".

Suitable polyether polyols which can be employed in the present reaction systems include those which are prepared by reacting an alkylene oxide, halogen-substituted or aromatic-substituted alkylene oxide or mixtures thereof with an active hydrogen-containing initiator compound.

Suitable oxides include, for example, ethylene oxide, propylene oxide, 1,2-butylene oxide, styrene oxide, epichlorohydrin, epibromohydrin, and mixtures thereof.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid and mixtures thereof.

Suitable initiators include, for example, ammonia, ethylenediamine, diaminopropanes, diaminobutanes, diaminopentanes, diaminohexanes, diethylenetriamine, triethylenetetramine, tetraethylenepentamine, pentamethylenehexamine, ethanolamine, aminoethylethanolamine, aniline, 2,4-toluenediamine, 2,6-toluenediamine, 2,4'-diaminodiphenylmethane, 4,4'-diaminodiphenylmethane, 1,3-phenylenediamine, 1,4-phenylenediamine, naphthylene-1,5-diamine, triphenylmethane 4,4',4"-triamine, 4,4'-di(methylamino) diphenylmethane, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3', 5'-tetra-ethyl-4,4'-diamino-diphenylmethane and amine aldehyde condensation products such as the polyphenylpolymethylene polyamines produced from aniline and formaldehyde and mixtures thereof.

Suitable polyester polyols include, for example, those prepared by reacting a polycarboxylic acid or anhydride with a polyhydric alcohol. The polycarboxylic acids may be aliphatic, cycloaliphatic, aromatic and/or heterocyclic and may be substituted (e.g., with halogen atoms) and/or unsaturated. Examples of suitable carboxylic acids and anhydrides include succinic acid; adipic acid; suberic acid; azelaic acid; sebacic acid; phthalic acid; isophthalic acid; terephthalic acid; trimellitic acid; phthalic acid anhydride; tetrahydrophthalic acid anhydride; hexahydrophthalic acid anhydride; tetrachlorophthalic acid anhydride; endomethylene tetrahydrophtalic acid anhydride; glutaric acid anhydride; maleic acid; maleic acid anhydride; fumaric acid; dimeric and trimeric fatty acids, such as those of oleic acid, which may be in admixture with monomeric fatty acids. Simple esters of polycarboxylic acids may also be used, such as terephthalic acid dimethyl ester, therephthalic acid bisglycol ester and mixtures thereof.

Examples of suitable polyhydric alcohols include ethylene glycol, 1,2-propylene glycol; 1,3-propylene glycol; 1,3-, 1,4-, 1,2- and 2,3-butylene glycol; 1,6-hexane diol; 1,8-octane diol; neopentyl glycol; cyclohexane dimethanol (1,4-bis-hydroxylmethyl cyclohexane); 2-methyl-1,3-propane diol, glycerol; trimethylol propane; 1,2,6-hexane triol,; 1,2, 4-butane triol; trimethylol ethylene; pentaerythritol; quitinol; mannitol; sorbitol; methylglycoside; diethylene glycol; triethylene glycol; tetraethylene glycol; polyethylene glycols; dipropylene glycol; polypropylene glycols; dibutylene glycol; polybutylene glycols and the like. The polyesters may contain some terminal carboxy groups although preferably they are hydroxyl-terminated. It is also possible to use polyesters of lactones such as caprolactone, or hydroxy carboxylic acids such as hydroxy caproic acid or hydroxyacetic acid.

The isocyanate-reactive component of the present reaction systems may further comprise chain extenders and/or cross-linking agents. Suitable chain extenders or cross-linking agents will be evident to those skilled in the art from the present disclosure. In general, useful chain extenders are those having a formula weight below about 750 and preferably about 62 to about 750 and a functionality of about 2. Suitable chain extenders may be selected from polyols such as ethylene glycol, diethylene glycol, butanediol, dipropylene glycol and tripropylene glycol; aliphatic and aromatic amines, e.g., 4,4'-methylene dianilines having a lower alkyl substituent positioned ortho to each N atom; certain iminofunctional compounds such as those disclosed in European Patent Applications Nos. 284 253 and 359 456 and certain enamino-functional compounds such as those disclosed in European Patent Application Nos. 359 456 having 2 isocyanate-reactive groups per molecule.

Suitable cross-linking agents include glycerol, oxyalkylated glycerol, pentaerythritol, sucrose, trimethylolpropane, sorbitol and oxyalkylated polyamines. The functionality of the cross-linking agents may range from 3 to about 8, preferably 3 to about 4, and the molecular weight may vary between the same ranges as disclosed above with regard to the chain extender. A preferred class of crosslinking agents includes oxypropylated derivatives of glycerol having a number average molecular weight of about 200 to about 750, glycerol and mixtures thereof.

A preferred isocyanate-reactive compound for use in the present reaction system is a propylene oxide adduct of glycerol having a functionality of 3 and an hydroxyl equivalent weight of 86 available as RUBINOL® R-015 from ICI Americas Inc. Blends of this polyol with glycerol are also useful in the present invention. In this instance, the weight ratio of the isocyanate-reactive compound to glycerol may be about 99:1 to about 50:50, preferably about 98:2 to about 90:10 and most preferably about 95:5 to about 90:10. This blend preferably comprises about 70 to about 98 and preferably about 80 to about 95% by weight of the isocyanate-reactive compound(s) in the present reaction systems.

Preferably the isocyanate-reactive component of the present invention contains water or other blowing agent(s) in addition to the isocyanate-reactive compounds discussed above. Blowing agents suitable for use with the present system are those conventionally used in the art, and include physical blowing agents such as water, chlorofluorocarbons and hydrocarbons; and chemical blowing agents, such as hydroxyfunctional cyclic ureas, etc. The blowing agents should be used in amounts up to about 10%, preferably about 0.1 to about 5% and more preferably about 0.25 to about 4% by weight of the total "B side" of the system.

The reaction systems of the present invention may be prepared by any conventional method which will be evident to one skilled in the art from the present disclosure. For example, the polyisocyanate component (or A side) of the reaction system may be mixed with the B side in conventional low or high pressure impingement mixing machines known in the art.

The polyisocyanate component and the number of isocyanate-reactive component(s) are mixed at suitable weight ratios such that the ratio of the number of isocyanate groups to isocyanate-reactive groups (commonly known as the index) is from about 75 to about 150%, with the proviso that when catalysts for the trimerization of isocyanates are used, the index may extend up to about 500%. Preferably, the index is from about 90 to about 115 and more preferably about 95 to about 105%.

The present reaction systems may further comprise conventionally used additives, such as flame retardants and catalysts, as needed for particular applications. Useful flame retardants include phosphonates, phosphites and phosphates, such as tris-(2-chloroisopropyl) phosphate (TCPP), dimethyl methyl phosphonate, ammonium polyphosphate and various cyclic phosphates and phosphonate esters known in the art; halogen-containing compounds known in the art, such as brominated diphenyl ether and other brominated aromatic compounds; melamine; antimony oxides, such as antimony pentoxide and antimony troxide; zinc compounds such as zinc oxide; alumina trihydrate; and magnesium compounds, such as magnesium hydroxide. The flame retardants may be used in any suitable amount which will be evident to those skilled in the art from the present disclaimers. However, it is preferred that the flame retardant be used in an amount of 0 to 55% of the B side of the system.

Useful catalysts include tertiary amines, organo-metallic compounds and amides of saturated or unsaturated $C_{12}$–$C_{24}$ fatty acids and di, tri or tetra-aminoalkanes having at least one catalytic amino group and at least one reactive amino group. Fatty amido-amines having hydroxyl substituents may also be used. A particularly preferred amido-amine compound is the reaction product N,N-dimethyl propyl diamine and a mixed fatty carboxylic acid available as BUSPERSE® 47 from Buckman Laboratories. The catalysts are used in amounts necessary for a particular application which will be evident to one skilled in the art from the present disclosure.

Other conventional additives generally used in the art may also be used with the reaction systems of the present invention. Examples of suitable additives include fillers, such as calcium carbonate, silica, mica, wollastonite, wood flour, melamine, glass or mineral fibers, glass spheres, etc.; pigments; surfactants; and plasticizers. Such additives will be used in amounts which will be evident to one skilled in the art from the present disclosure.

The present invention is still further directed to a process for producing molded articles comprising reacting (1) an organic polyisocyanate; (2) a compound containing a plurality of isocyanate-reactive groups; and (3) an internal mold release system comprising (a) a carboxylic acid and (b) a fatty polyester, a fatty ester, a fatty amide or mixtures thereof.

In the reaction system of the present invention and the process for producing molded articles utilizing the reaction system, the internal mold release system is used in an amount of from about 0.55 to about 18 and preferably about 2.6 to about 6 parts by weight based upon the weight of the reaction system.

The present invention is especially suitable for use with SRIM techniques which utilize a closed mold. However, the invention will find application in open mold processes which utilize spray techniques, i.e., where the resin system is first sprayed over the mat and then the system is allowed to cure either in an open or closed mold.

Parts prepared with SRIM processes are usually prepared with a reinforcement mat pre-placed in the mold. The reaction system is injected into the closed mold over the mat. The resulting part is a mat-reinforced composite which is demolded after the reaction system cures.

The reaction systems of the present invention may be used with any reinforcement mat conventionally used in the SRIM art. Suitable reinforcement mats include woven or non-woven structural fibers such as glass, carbon, metal, graphite, silicon carbide, alumina, titania, boron, cellulosic, lignocellulosic, aromatic polyamide, polyester, polyolefin and mixtures thereof. The final reinforced molded article may contain between 0.5 to about 95 wt % and preferably about 10 to about 70 wt % of the reinforcing material. The diameter of the fibers is not critical and may vary from about 0.001 to about 1.0 mm. The mat may be optionally pre-treated with sizing agents, coatings, adhesion promoters and other kinds of surface treatments known in the art.

In the process for producing molded articles according to the present invention, the surfaces of the molds must be pre-treated with known external mold release agents or mixtures thereof. For example, the mold surfaces may be treated with conventional external mold release agents such as soaps; and waxes, e.g., carnuba wax, montan wax, etc.; and mixtures thereof. It is preferred that the external release agents(s) used have a high melting point and demonstrate little or no transfer to the molded parts.

The present invention will now be illustrated by reference to the following specific non-limiting examples.

EXAMPLES

The following examples demonstrate the release properties provided by the internal mold release systems of the present invention.

Example 1

Samples 1–6 and Comparative Formulations 1–3 were evaluated for release performance. In each instance, the internal mold release system was blended into the polyol component or the "B side" of the system. The polyol blends were prepared by simply blending all polyol components listed for each sample and formulation in Table 1 in a standard mixing vessel and then charging each composition into a Canon H-100 high pressure metering unit.

Components of the present formulations which are solid materials at room temperature were first melted and then added to a heated mixture of the polyol component under high shear mixing to prepare the B side of the reaction system. The blend was maintained at a temperature high enough so that the internal mold release system would not be percipitated during its addition. The blend was then allowed to cool during mixing. After cooling, water and catalyst were added to form the final "B side" mixture.

The release evaluations were conducted utilizing the polyol compositions set forth in Table 1 as the B side of the reaction system and RUBINATE® 8700 polyisocyanate available from ICI Americas Inc., as the "A side" of the system. RUBINATE® 8700 is a mixture of diisocyanato diphenylmethane isomers with oligomeric polymethylene polyphenylene polyisocyanates and has an NCO content of 31.5%.

Each reaction system was evaluated for release from a mold in a full scale machine process. A standard Cannon H-100 high pressure metering unit with an impingement mixing head was used. An aluminum door panel substrate mold mounted in a 75 ton Cannon press was used as the surface from which release was determined. An open pour process was employed wherein the reaction system was injected into an open mold containing a glass mat. The glass mat used was a 1 oz./ft$^2$ of an N-754 continuous strand non-woven glass mat available from Nico Fibers. The mold was then closed for the cure time of the foam as determined by the appropriate green strength for the part, which was 90 seconds (see below). After cure, the mold was opened and the release of the LD-SRIM part was observed.

Prior to injection of the A and B side components, the mold was first stripped to bare metal by scrubbing with N-methyl-2-pyrrolidinone (commonly referred to as N-methyl pyrolidone) to remove any wax. The N-methyl-2-pyrrolidinone was then removed by wiping the mold with mineral spirits. The mold was then waxed with a paste wax having a high temperature use range. The wax used in Examples 1 and 2 was LH-1 available from Chem Trend which has a use range of 185° F.–250° F.

The molding process was carried out under the following conditions:

| Component Temperatures | 85° F. |
|---|---|
| Mold Temperature | 155° F. |
| Injection Pressure | 2000 psi |
| Injection Rate | 250 g/sec |
| Cure Time | 90 sec |

The release performance was evaluated by counting the number of releases obtained on consecutive molded parts, i.e., without the further application of wax. The release evaluations were carried out until a maximum of forty parts were obtained, at which time the evaluation was terminated.

Sample 3, which used stearyl stearamide as the fatty amide in combination with the carboxylic acid (polymerized oleic acid), demonstrated relatively inferior release properties due to inadvertent variations in the mold temperature.

Example 1 demonstrates that improvements in release characteristics are obtained when the combination of materials presently claimed is used in comparison to one of the components alone. That is, Formulations 1 and 5 which utilize the present invention showed significant improvement over Comparative Formulations 1 and 2 which utilize only the carboxylic acid and fatty ester components alone, respectively. Likewise, Formulations 4 and 6, which utilize the present invention demonstrate improved, synergistic

TABLE 1

| Polyol Components | Form. 1 | Form. 2 | Form. 3 | Form. 4 | Form. 5 | Form. 6 | Comp. Form. 1 | Comp. Form. 2 | Comp. Form. 3 |
|---|---|---|---|---|---|---|---|---|---|
| RUBINOL ® R015 | 100.0 | 100.0 | 100.0 | 100.0 | 100.0 | 100.0 | 100.0 | 100.0 | 100.0 |
| GLYCERINE | 5.00 | 5.0 | 5.0 | 5.0 | 5.0 | 5.0 | 5.0 | 5.0 | 5.0 |
| L-5440 | 1.50 | 1.50 | 1.50 | 1.50 | 1.50 | 1.50 | 1.50 | 1.50 | 1.50 |
| Water | 1.60 | 1.50 | 1.50 | 1.50 | 1.60 | 1.60 | 1.60 | 1.60 | 1.60 |
| POLYCAT ® 8 | 5.0 | 5.0 | 5.0 | 5.0 | 5.0 | 5.0 | 6.0 | 4.5 | 3.0 |
| HYSTRENE ® 3695 | — | — | — | — | 6.55 | 6.5 | 13.35 | — | — |
| Oleic acid | 6.55 | 6.55 | 6.55 | 6.55 | — | — | — | — | — |
| KEMESTER ® 5721 | 5.75 | — | — | — | 5.75 | — | — | 12.13 | — |
| KEMESTER ® EGDS | — | 6.55 | — | — | — | — | — | — | — |
| KEMAMIDE ® S180 | — | — | 6.55 | — | — | — | — | — | — |
| KEMAMIDE ® E221 | — | — | — | 6.55 | — | 6.50 | — | — | 13.30 |
| A/B mix ratio | 1.62 | 1.60 | 1.60 | 1.60 | 1.62 | 1.63 | 1.62 | 1.65 | 1.64 |
| No. of releases | 12 | 9 | 2 | 16 | 12 | 20 | 5 | 6 | 2 |

RUBINOL® R015 is oxypropylated glycerine having an OH number of 650 available from ICI Americas Inc.

L-5440 is a silicone surfactant available from OSi Inc.

POLYCAT® 8 is an N,N-dimethyl-cyclohexyl amine catalyst available from Air Products.

HYSTRENE® 3695 is polymerized oleic acid available from Witco Chemicals.

KEMESTER® 5721 is tridecyl stearate available from Witco Chemicals.

KEMESTER® EGDS is ethylene glycol distearate available from Witco Chemicals.

KEMAMIDE® S180 is stearyl stearamide available from Witco Chemicals.

KEMAMIDE® E221 is erucyl erucamide available from Witco Chemicals.

As can be seen from the data set forth in Table 1, the internal mold release systems containing a carboxylic acid and certain fatty acid esters or fatty amides according to the invention provide multiple release properties in SRIM systems.

effects versus Comparative Formulations 2 and 3 which use the carboxylic acid and fatty amide components alone, respectively. This superior, synergistic effect of the present components was unexpected prior to this present invention.

Example 2

The polyol compositions set forth in Tables 2, 3 and 4 were prepared in the same manner as those set forth in Table 1 discussed above with reference to Example 1.

The release characteristics of the polyol compositions were also evaluated by preparing full scale parts in the manner described in Example 1. The "B side" of the reaction systems are those identified in Table 2. The "A side" of each system was RUBINATE® 8700 polyisocyanate as also used in Example 1.

TABLE 2

| Polyol Components | Form 7 | Form 8 | Form 9 | Form 10 | Form 11 | Comp Form 4 | Comp Form 5 |
|---|---|---|---|---|---|---|---|
| RUBINOL ® R015 | 100.0 | 100.0 | 100.0 | 100.0 | 100.1 | 100.0 | 100.0 |
| GLYCERINE | 5.0 | 5.0 | 5.0 | 5.0 | 5.0 | 5.0 | 5.0 |
| L-5440 | 1.50 | 1.50 | 1.50 | — | — | 1.50 | 1.50 |
| L-1000 | — | — | — | 2.0 | — | — | — |
| L-6980 | — | — | — | — | 1.50 | — | — |
| Water | 1.50 | 1.50 | 1.60 | 1.60 | 1.60 | 1.50 | 1.50 |
| POLYCAT ® 8 | 5.00 | 5.00 | 5.00 | 5.00 | 4.00 | 5.0 | 5.0 |
| DABCO ® 880 | — | — | 0.50 | — | — | — | — |
| DABCO ® 33 LV | — | — | — | 0.65 | 0.65 | — | — |
| FOAMREZ ® UL-32 | — | — | — | 0.15 | 0.15 | — | — |
| PDI-4803 | — | — | 4.00 | 4.00 | 4.00 | — | — |
| HYSTRENE ® 3695 | 6.50 | 6.50 | 6.50 | 6.50 | 6.50 | — | — |

TABLE 2-continued

| Polyol Components | Form 7 | Form 8 | Form 9 | Form 10 | Form 11 | Comp Form 4 | Comp Form 5 |
|---|---|---|---|---|---|---|---|
| IMR A | 11.50 | — | — | — | — | 11.25 | — |
| IMR B | — | 11.50 | 6.75 | 5.00 | 3.30 | — | 11.25 |
| A/B Mix Ratio | 1.55 | 1.55 | 1.56 | 1.59 | 1.61 | 1.62 | 1.62 |
| No. of releases | 40+ | 40+ | 40+ | 40+ | 27/32[1] | 22 | 16 |

[1]Represents duplicate runs of this sytem.

TABLE 3

| Polyol Components | Formulation 12 | Formulation 13 | Formulation 14 | Formulation 15 | Formulation 16 | Formulation 17 | Formulation 18 |
|---|---|---|---|---|---|---|---|
| RUBINOL® R015 | 100.0 | 100.0 | 100.0 | 100.0 | 100.0 | 100.0 | 100.0 |
| GLYCERINE | 5.0 | 5.0 | 5.0 | 5.0 | 5.0 | 5.0 | 5.0 |
| L-5440 | — | — | 1.50 | 1.50 | 1.50 | 1.50 | — |
| L-6980 | 1.50 | 1.50 | — | — | — | — | 1.50 |
| Water | 1.60 | 1.60 | 1.65 | 1.60 | 1.60 | 1.60 | 1.60 |
| POLYCAT® 8 | 4.00 | 4.00 | 4.50 | 4.00 | 4.00 | 4.00 | 4.00 |
| DABCO® 33 LV | 0.50 | 0.65 | — | — | — | — | 0.65 |
| FOAMREZ® UL-32 | — | 0.15 | — | — | — | — | 0.15 |
| PDI-4803 | — | 4.00 | — | — | — | — | 4.0 |
| HYSTRENE® 3695 | 6.50 | 6.50 | 4.90 | 3.25 | — | — | — |
| Oleic acid | — | — | — | — | 6.50 | — | — |
| TOFA acid | — | — | — | — | — | 6.50 | — |
| Adipic acid | — | — | — | — | — | — | 1.68 |
| IMR B | — | — | 6.55 | 6.50 | 3.25 | 3.25 | 3.24 |
| IMR C | 6.75 | 3.30 | — | — | — | — | — |
| Mix Ratio | 1.60 | 1.61 | 1.63 | 1.65 | 1.66 | 1.66 | 1.67 |
| No. of releases | 40+ | 18/19 | 40+ | 40+ | 34 | 27 | 14/11[2] |

[2]Represents duplicate runs of this system.

TABLE 4

| Polyol Components | Formulation 19 | Formulation 20 | Formulation 21 | Formulation 22 |
|---|---|---|---|---|
| RUBINOL® R 015 | 100.0 | 100.0 | 100.0 | 100.0 |
| GLYCERINE | 5.00 | 5.00 | 5.00 | 5.00 |
| L-6980 | 1.50 | 1.50 | 1.50 | 1.50 |
| Water | 1.60 | 1.60 | 1.60 | 1.60 |
| POLYCAT® 8 | 2.50 | 4.00 | 4.00 | 4.00 |
| DABCO® 33 LV | 0.65 | 0.65 | 0.65 | 0.65 |
| FOAMREZ® UL-32 | 0.15 | 0.15 | 0.15 | 0.15 |
| HYSTRENE® 3695 | 6.70 | 6.70 | 6.68 | 6.68 |
| IMR B | — | — | — | — |
| IMR C | 3.35 | 3.35 | 3.35 | 3.35 |
| BUSPERSE® 47 | 6.70 | — | — | — |
| KEMAMIDE® E221 | — | 6.70 | — | — |
| Tallow diamine | — | — | 4.00 | — |
| TCPP | — | — | — | 6.68 |
| A/B Mix Ratio | 1.62 | 1.59 | 1.63 | 1.57 |
| No. of releases | 40+ | 25 | 19 | 40+ |

L1000 and L6980 are poly(dimethylsiloxane) surfactants available from OSi Chemicals.

DABCO® 33LV is 33% diethylene diamine octoate in dipropylene glycol available from Air Products.

DABCO® 8800 is acid blocked Dabco 33LV available from Air Products.

FOAMREZ® UL32 as a tin catalyst available from Witco Chemical.

PDI-4803 is a black pigment dispersed in a polyol available from Ferro.

IMR A, IMR B and IMR C are complex, mixed fatty polyesters falling within the scope of the present invention.

BUSPERSE® 47 is a fatty amide of N,N-dimethyl propylene diamine available from Buckman Laboratories.

Formulations 7 to 18 demonstrate the excellent release properties imparted to LD-SRIM systems by an internal mold release system comprising a carboxylic acid and a fatty polyester. Of these, Formulations 9, 10 and 11, when directly compared to Comparative Formulations 4 and 5 (which utilize the fatty polyesters alone), evidence the novel synergistic effects of the present invention. Formulations 19–22 further demonstrate the release results obtained with internal mold release systems comprising a carboxylic acid, a fatty polyester and additional components, including fatty acid esters and fatty amides. Formulation 19 demonstrates the superior release properties obtained with an internal mold release agent comprising a carboxylic acid, a fatty polyester and an amido-amine catalyst, such as BUSPERSE® 47. Formulations 20–21 demonstrate that excellent release properties are obtained when a carboxylic acid is combined with a fatty polyester and a fatty amide. Formulation 22 demonstrates that no reduction in release activity occurs when the present internal mold release systems are combined with conventional flame retardants.

The present invention may be embodied in other specific forms without departing from the spirit and essential attributes thereof and accordingly, reference should be made to the appended claims, rather than to the foregoing specification as indicating the scope of the invention.

I claim:

1. A molded foam article produced by a process comprising reacting (1) an organic polyisocyanate; (2) at least one compound containing a plurality of isocyanate-reactive groups; and (3) an internal mold release system comprising (a) a carboxylic acid and (b) a compound selected from the group consisting of a fatty polyester, a fatty acid ester and a fatty amide.

2. A process as in claim 1, wherein said carboxylic acid is selected from the group consisting of polymerized oleic acid, oleic acid, adipic acid, lauric acid, stearic acid, hydroxystearic acid, terephthalic acid, behenic acid, arachidonic acid, linoleic acid, linolenic acid, ricinoleic acid and mixtures thereof.

3. A process as in claim 1 wherein said fatty polyester is a mixed ester comprising the reaction product of (a) a monofunctional monomer; (b) a difunctional monomer; and (c) a polyfunctional monomer.

4. A process as in claim 3, herein said fatty polyester is a mixed ester comprising the reaction product of (i) aliphatic dicarboxylic acids; (ii) aliphatic polyols and (iii) monocarboxylic acids comprising 12 to 30 carbon atoms.

5. A process as in claim 4, wherein said fatty polyester comprises the reaction product of (1) adipic acid, (ii) pentaerythritol and (iii) oleic acid.

6. A process as in claim 1, herein said fatty acid ester is selected from the group consisting of buryl stearate, tridecyl stearate, glycerol trioleate, isocetyl stearate, ditredecyl adipate, stearyl stearate, glycerol tri-(12-hydroxy) stearate, dioctyl dimerate, ethylene glycol distearate.

7. A process as in claim 1 wherein said fatty amide is selected from group consisting of oleamide, stearamide, stearyl stearamide, N-2-hydroxyethyl (12-hydroxy) stearamide and erucyl erucamide.

* * * * *